(12) United States Patent
Song et al.

(10) Patent No.: US 12,280,829 B2
(45) Date of Patent: Apr. 22, 2025

(54) SIDE BODY STRUCTURE FOR VEHICLE

(71) Applicants: Hyundai Motor Company, Seoul (KR); Kia Corporation, Seoul (KR)

(72) Inventors: Won Ki Song, Seongnam-si (KR); Jung Jong Chun, Seoul (KR); Yeongjae Kim, Seoul (KR); Heedae Oh, Suwon-si (KR); Joon Tak Park, Gunpo-si (KR); Seokju Gim, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 375 days.

(21) Appl. No.: 17/886,758

(22) Filed: Aug. 12, 2022

(65) Prior Publication Data

US 2023/0202571 A1    Jun. 29, 2023

(30) Foreign Application Priority Data

Dec. 27, 2021    (KR) .......................... 10-2021-0188453

(51) Int. Cl.
*B62D 25/02*    (2006.01)
*B62D 21/15*    (2006.01)
*B62D 25/04*    (2006.01)

(52) U.S. Cl.
CPC ........... *B62D 25/02* (2013.01); *B62D 21/157* (2013.01); *B62D 25/04* (2013.01)

(58) Field of Classification Search
USPC .............................. 296/210, 187.05, 146.15
See application file for complete search history.

(56) References Cited

U.S. PATENT DOCUMENTS

| 8,662,575 | B2 * | 3/2014 | Tamura .................. | B62D 25/04 |
| | | | | 296/209 |
| 9,751,569 | B2 * | 9/2017 | Ayuzawa ............... | B62D 25/04 |
| 9,884,651 | B2 * | 2/2018 | Irie ....................... | B62D 25/025 |
| 2011/0187155 | A1 * | 8/2011 | Ameloot .................... | B60J 1/10 |
| | | | | 29/428 |
| 2023/0140939 | A1 * | 5/2023 | Baiju .................. | B60R 13/0815 |
| | | | | 296/187.02 |

FOREIGN PATENT DOCUMENTS

KR           100267904 B1  * 10/2000

* cited by examiner

*Primary Examiner* — Amy R Weisberg
*Assistant Examiner* — Veronica M Shull
(74) *Attorney, Agent, or Firm* — Slater Matsil, LLP

(57) ABSTRACT

An embodiment side body structure for a vehicle includes a center pillar including an outer flange part extending from an outer surface of the center pillar in a vehicle body length direction and a glass coupled to the outer flange part. Another embodiment side body structure for a vehicle includes a center pillar including an outer flange part extending along a vehicle body length direction and coupled to a side sill and a joint member coupled to the outer flange part and the side sill in a vertical direction.

20 Claims, 14 Drawing Sheets

FIG. 3A
FIG. 3B
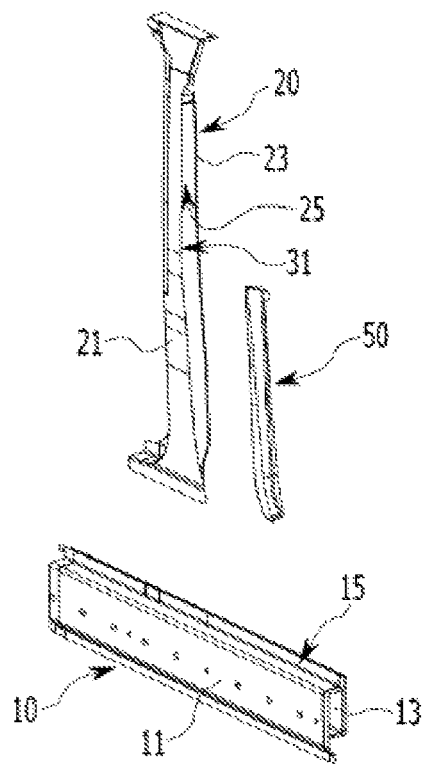
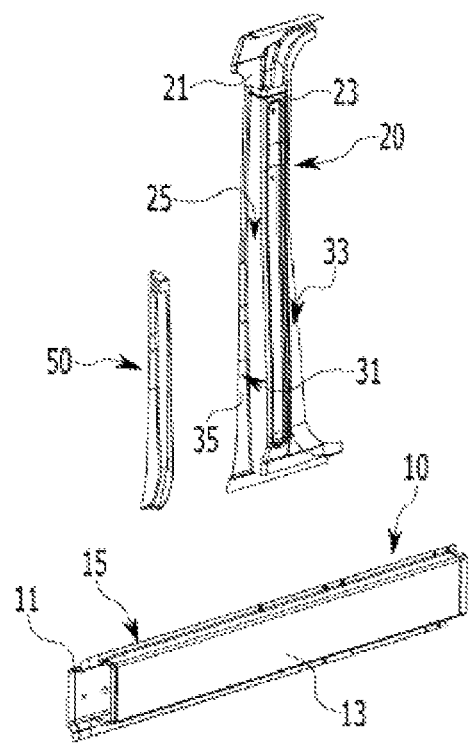

SIDE BODY STRUCTURE FOR VEHICLE

CROSS-REFERENCE TO RELATED APPLICATIONS

This application claims the benefit of Korean Patent Application No. 10-2021-0188453, filed on Dec. 27, 2021, which application is hereby incorporated herein by reference.

TECHNICAL FIELD

An embodiment of the present invention relates to a vehicle body of a vehicle.

BACKGROUND

Recently, a vehicle industry has introduced a new concept of future mobility visions for realizing a human-centered dynamic future city. One of these future mobility solutions is a PBV (purpose-built vehicle) as a purpose-based mobility unit.

The PBV is an environment-friendly vehicle that provides a customized service for passengers during a period in which they travel to their destination, and is typically electric vehicle-based.

The vehicle body of the PBV is manufactured in a box shape having a wide interior space. A vehicle body of the PBV includes an underbody (which is frequently called a rolling chassis or a skateboard) and an upper body mounted on the underbody.

For example, the vehicle body of the PBV includes a front swing door mounted on one side structure body of the upper body and a rear sliding door mounted on another side structure body. A fixed glass is applied to a portion (e.g., a door-less portion) to which no door is applied on the respective sides of the side structure body.

As for the vehicle body of such a PBV, it is most important to secure the rigidity of the connection of the members by applying the fixed glass to the side body structure, and it should have a characteristic that it can absorb an external force while securing the strength of the side body structure.

The above information disclosed in this background section is only for enhancement of understanding of the background of the invention, and therefore it may contain information that does not form the prior art that is already known to a person of ordinary skill in the art.

SUMMARY

An embodiment of the present invention relates to a vehicle body of a vehicle. Particular embodiments relate to a side body structure of a vehicle body for a purpose-built vehicle (PBV).

Embodiments of the present invention provide a side body structure for a vehicle that may secure connection robustness of members in the vehicle body of the PBV to which the fixed glass is applied, and increase the structural strength for side collisions.

A side body structure for a vehicle according to an embodiment of the present invention may include a center pillar including an outer flange part extending from an outer surface in the vehicle body back and forth direction and a glass fixed to the outer flange part.

In the side body structure for the vehicle according to an embodiment of the present invention, the outer flange part may be connected in the same plane as the outer surface of the center pillar and may be provided at the outermost side along the vehicle width direction of the center pillar.

A side body structure for a vehicle according to an embodiment of the present invention may include a center pillar including an outer flange part along a vehicle body back and forth direction and coupled to a side sill and a joint member coupled to the outer flange part and the side sill in a vertical direction.

In the side body structure for the vehicle according to an embodiment of the present invention, the side sill may include a sill flange spaced apart from the outer flange part.

In the side body structure for the vehicle according to an embodiment of the present invention, the joint member may be coupled to the outer flange part and the sill flange.

In the side body structure for the vehicle according to an embodiment of the present invention, the joint member may include a joint bonding surface bonded to the pillar reinforcing surface along the vehicle body back and forth direction of the center pillar, a first joint flange extending from one side edge of the joint bonding surface in the vehicle body back and forth direction and bonded to the outer flange part, and a second joint flange extending from the other side edge of the joint bonding surface in the vehicle body back and forth direction and bonded to a sill flange formed on the side sill.

In the side body structure for the vehicle according to an embodiment of the present invention, the joint member may further include a third joint flange connected to the lower part of the first joint flange and the lower part of the second joint flange and bonded to the upper surface of the side sill.

The side body structure for the vehicle according to an embodiment of the present invention may further include a glass supporting member bonded to the pillar reinforcing surface of the center pillar along the vehicle body back and forth direction, the outer flange part, and the upper part of the joint member and connected to the rear pillar along the vehicle body back and forth direction.

In the side body structure for the vehicle according to an embodiment of the present invention, the joint member may include a joint bonding surface bonded to the pillar reinforcing surface, a first joint flange extending from one side edge of the joint bonding surface in the vehicle body back and forth direction and bonded to the outer flange part, a second joint flange extending from the other side edge of the joint bonding surface in the vehicle body back and forth direction and bonded to a sill flange formed on the side sill, a third joint flange connected to the lower part of the first joint flange and the lower part of the second joint flange and bonded to the upper surface of the side sill, and a fourth joint flange connected to the upper part of the first joint flange and the upper part of the second joint flange and bonded to the glass supporting member.

The side body structure for the vehicle according to an embodiment of the present invention may further include an impact member bonded to the joint member and connected to the rear pillar along the vehicle body back and forth direction.

In the side body structure for the vehicle according to an embodiment of the present invention, the joint member may include a joint bonding surface bonded to the pillar reinforcing surface along the vehicle body back and forth direction of the center pillar and bonded to the impact member, a first joint flange extending from one side edge of the joint bonding surface in the vehicle body back and forth direction and bonded to the outer flange part and the impact member, and a second joint flange extending from the other side edge of the joint bonding surface in the vehicle body back and forth direction and bonded to a sill flange formed on the side sill and the impact member.

In the side body structure for the vehicle according to an embodiment of the present invention, the impact member may include a forming part protruded outward along the vehicle width direction and coupled to the outer side panel.

The side body structure for the vehicle according to an embodiment of the present invention may further include an extension member coupled to the rear pillar and bonded to the impact member.

Embodiments of the present invention may secure the support strength of the glass, the structural strength of the center pillar, and the connection robustness of the center pillar and the side sill, and may further increase the structural strength for a side collision.

Further, the effects which may be obtained or predicted by the embodiment of the present invention will be directly or implicitly disclosed in the detailed description of the embodiments of the present invention. That is, various effects which are predicted by the embodiments of the present invention will be disclosed in the detailed description to be described below.

BRIEF DESCRIPTION OF THE DRAWINGS

These drawings are presented to describe embodiments of the present invention, and, thus, the technical spirit of the present invention should not be interpreted as being limited to the accompanying drawings.

FIGS. 3A and 3B are exploded perspective views showing a center pillar and a joint member applied to a side body structure for a vehicle according to an embodiment of the present invention.

Figure 1:
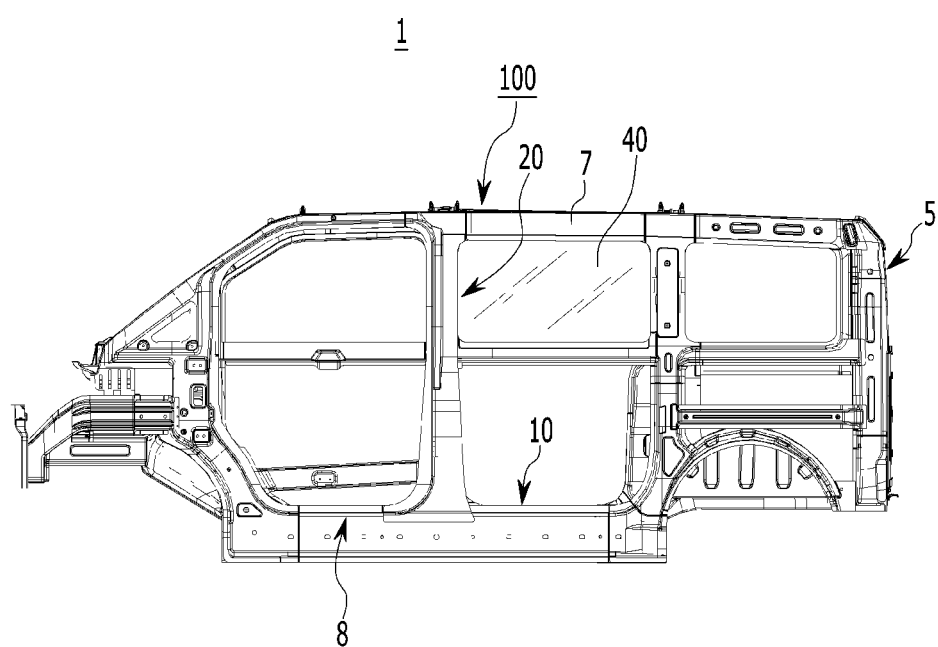
FIG. 1 is a view schematically illustrating a side body structure for a vehicle according to an embodiment of the present invention.

The following reference identifiers may be used in connection with the accompanying drawings to describe exemplary embodiments of the present disclosure.

| | |
|---|---|
| 1: vehicle body | 5: upper body |
| 7: roof side | 8: door mounting part |
| 9: outer side panel | 10: side sill |
| 11: outer sill member | 13: inner sill member |
| 15: sill flange | 20: center pillar |
| 21: outer pillar member | 23: inner pillar member |
| 25: pillar reinforcing surface | 31: outer flange part |
| 33: inner flange part | 35: outer flange surface |
| 40: glass | 50: joint member |
| 51: joint bonding surface | 53: first joint flange |
| 55: second joint flange | 57: third joint flange |
| 59: fourth joint flange | 60: glass supporting member |
| 61: first bonding flange | 62: second bonding flange |
| 63: third bonding flange | 64: fourth bonding flange |
| 65: rear pillar | 67: pillar flange |
| 70: impact member | 71: fifth bonding flange |
| 72: sixth bonding flange | 73: seventh bonding flange |
| 74: eighth bonding flange | 77: forming part |
| 79: bonding sealer | 80: extension member |
| 100: side body structure for vehicle | |

It should be understood that the above-referenced drawings are not necessarily to scale, presenting a somewhat simplified representation of various preferred features illustrative of the basic principles of the disclosure. The specific design features of embodiments of the present disclosure, including, for example, specific dimensions, orientations, locations, and shapes, will be determined in part by the particular intended application and use environment.

DETAILED DESCRIPTION OF ILLUSTRATIVE EMBODIMENTS

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

The terminology used herein is for the purpose of describing particular embodiments only and is not intended to be limiting of the present disclosure. As used herein, singular forms are intended to include plural forms as well, unless the context clearly indicates otherwise.

As used herein, the term "comprises" and/or "comprising" refers to the presence of specified features, integers, steps, acts, elements and/or components, but it should also be understood that it does not exclude a presence or an addition of one or more other features, integers, steps, acts, components, and/or groups thereof. As used herein, the term "and/or" includes any one or all combinations of one or more related items. The term "coupled" denotes a physical relationship between two components in which components are directly connected to each other or indirectly connected through one or more intermediary components, for example, by welding, self-piercing rivets (SPR), flow drill screws (FDS), structural adhesives, and the like.

The terms "vehicle", "of a vehicle", "automobile", or other similar terms used herein are generally used to cover various vehicles such as passenger vehicles including sports cars, sport utility vehicles (SUVs), buses, trucks, commercial vehicles, and the like, and cover hybrid vehicles, electric vehicles, hybrid electric vehicles, fuel cell electric vehicles, and other alternative fuel vehicles (i.e., vehicles driven by a fuel derived from resources other than petroleum).

Hereinafter, embodiments of the present invention will now be described in detail with reference to the accompanying drawings.

FIG. 1 is a view schematically showing a side body structure for a vehicle according to an embodiment of the present invention.

Referring to FIG. 1, for example, a side body structure for a vehicle 100 including an outer panel according to an embodiment of the present invention may be applied to the vehicle body 1 of the purpose-built vehicle (PBV).

The PBV may be defined as an environment-friendly vehicle that is electric vehicle-based and provides a customized service for passengers while traveling to a destination. Furthermore, the PBV may be designed to have a box shape with a wide interior space.

The vehicle body 1 of the PBV includes a skateboard-type under body (not shown) (those skilled in the art usually refer to it as a rolling chassis) and an upper body 5 assembled to the under body.

Here, the upper body 5 includes the side body structure for the vehicle 100 according to an embodiment of the present invention. Furthermore, the side body structure for the vehicle 100 according to an embodiment of the present invention includes a roof side 7 disposed on the upper part, a side sill 10 disposed on the lower part, and a door mounting part 8 disposed between the roof side 7 and the side sill 10.

In the present specification, for example, a reference direction for describing constituent elements may be set to be a vehicle body back and forth direction (e.g., a vehicle body length direction), a vehicle width direction, and a perpendicular direction.

"Upper end portion", "upper portion", "upper end", or "upper portion surface" of a component indicates an end portion, an upper portion, an upper end, or a surface of the component that is positioned relatively higher in the drawing, and "lower end portion", "lower portion", "lower end", or "lower portion surface" of a component indicates an end portion, a lower portion, a lower end, or a surface of the component that is positioned relatively lower in the drawing.

"End" (for example, one end, another end, or the like) of a component indicates an end of the component in any direction, and "end portion" (for example, one end portion, another end portion, or the like) of a component indicates a certain part of the component including the end.

The side body structure for the vehicle 100 according to an embodiment of the present invention is made of a structure that may secure the connection robustness of members and can increase the structural strength against side collisions.

Figure 2:
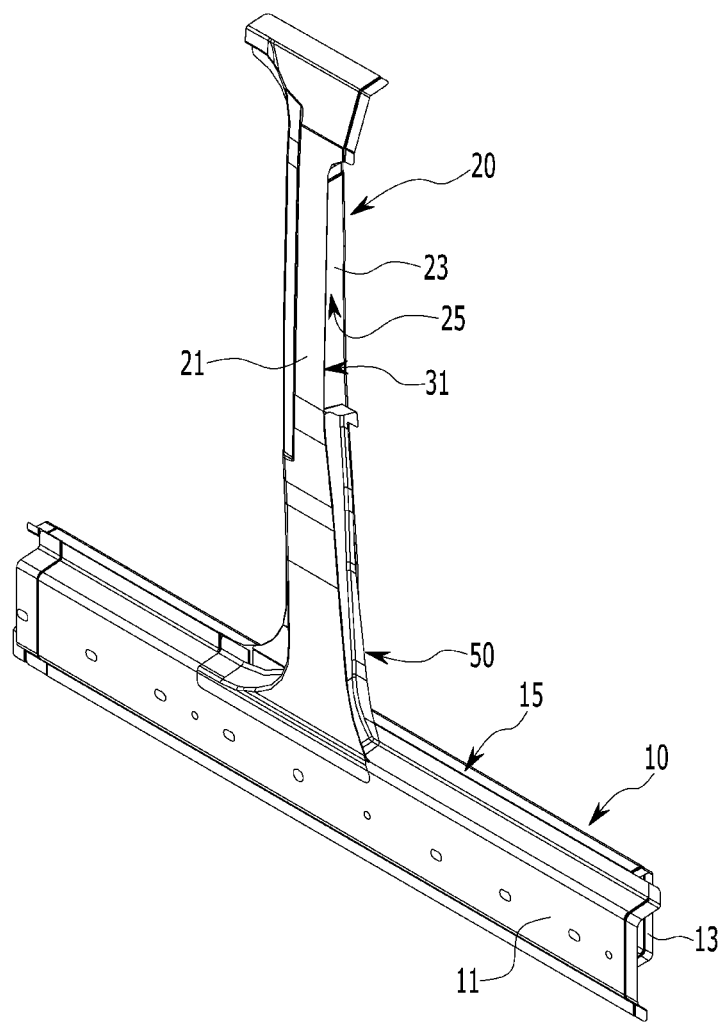
FIG. 2 is a perspective view showing a center pillar and a joint member applied to a side body structure for a vehicle according to an embodiment of the present invention.

FIG. 2 is a perspective view showing a center pillar and a joint member applied to a side body structure for a vehicle according to an embodiment of the present invention, and FIG. 3 is an exploded perspective view showing a center pillar and a joint member applied to a side body structure for a vehicle according to an embodiment of the present invention.

Referring to FIG. 1 to FIG. 3, the side body structure for the vehicle 100 according to an embodiment of the present invention basically includes a center pillar 20, a glass 40, and a joint member 50.

In an embodiment of the present invention, the center pillar 20 is configured to connect the roof side 7 and the side sill 10 in the vertical direction.

Here, the side sill 10 includes an outer sill member 11 and an inner sill member 13 coupled to each other. Furthermore, the side sill 10 includes a sill flange 15 adapted to couple the outer sill member 11 and the inner sill member 13. The sill flange 15 is formed on the inner side along the vehicle width direction in the side sill 10.

The center pillar 20 includes an outer pillar member 21 and an inner pillar member 23 that are coupled to each other. The outer pillar member 21 and the inner pillar member 23 are coupled to the roof side 7 through the upper part and coupled to the side sill 10 through the lower part.

Furthermore, the center pillar 20 includes a pillar reinforcing surface 25 along the vehicle body back and forth direction. In one example, the pillar reinforcing surface 25 may be formed on the inner pillar member 23.

The center pillar 20 according to an embodiment of the present invention includes an outer flange part 31 and an inner flange part 33 configured to couple the outer pillar member 21 and the inner pillar member 23.

The outer flange part 31 may be formed by coupling a portion extending from one end of the outer pillar member 21 and a portion extending from one end of the inner pillar member 23 to each other.

The outer flange part 31 is formed on the outer side along the vehicle width direction in the center pillar 20. The outer flange part 31 extends from the outer surface of the center pillar 20 in the vehicle body back and forth direction.

Specifically, the outer flange part 31 may extend from the outer surface of the center pillar 20 in the front and rear direction of the vehicle body without a step difference from the outer pillar member 21. Accordingly, the outer flange part 31 may be coupled to the outer surface of the outer pillar member 21 with the same plane and may be provided at the outermost side along the vehicle width direction of the center pillar 20.

Also, the inner flange part 33 is formed on the inner side along the vehicle width direction in the center pillar 20. The inner flange part 33 extends from the inner surface of the center pillar 20 in the vehicle body back and forth direction. That is, the inner flange part 33 extends in a direction opposite to the extension direction of the outer flange part 31.

Here, the outer flange part 31 and the inner flange part 33 are disposed to be spaced apart from each other along the vehicle width direction. Also, the outer flange part 31 is disposed to be spaced apart from the sill flange 15 along the vehicle width direction.

Furthermore, the outer flange part 31 includes an outer flange surface 35 that gradually increases in width from the upper end to the lower end.

In an embodiment of the present invention, the glass 40 is a windshield glass and is fixed to the portion to which no door is applied in the side body structure for the vehicle 100.

Figure 4:
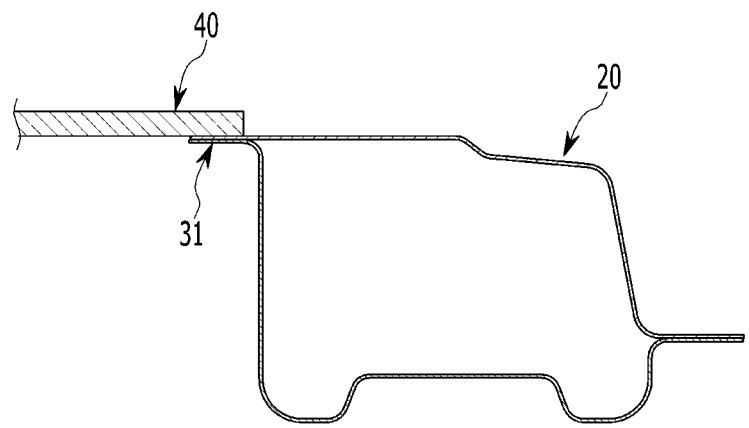
FIG. 4 is a cross-sectional view showing a coupling structure of a glass applied to a side body structure for a vehicle according to an embodiment of the present invention.

FIG. 4 is a cross-sectional view showing a coupling structure of a glass applied to a side body structure for a vehicle according to an embodiment of the present invention.

Referring to FIG. 4, the glass 40 according to an embodiment of the present invention is fixed to the outer flange part 31 of the center pillar 20.

The glass 40 may be fixed to the outer flange part 31.

Referring to FIG. 1 to FIG. 3, in an embodiment of the present invention, the joint member 50 reinforces the strength of the center pillar 20 and is configured to connect the outer flange part 31 of the center pillar 20 and the side sill 10.

The joint member 50 is coupled to the outer flange part 31 and the side sill 10 along the vertical direction. The joint member 50 may be coupled (e.g., connected) to the outer flange part 31 and the sill flange 15 spaced apart from each other in the vehicle width direction in the horizontal cross-section.

Figure 5:
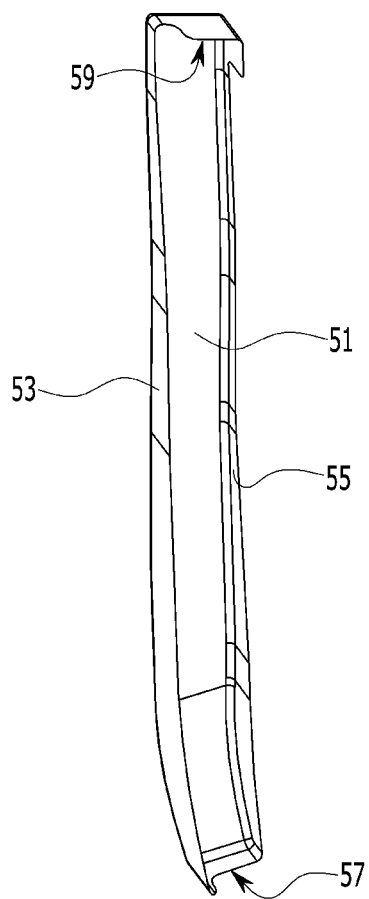
FIG. 5 and FIG. 6 are views showing a joint member portion applied to a side body structure for a vehicle according to an embodiment of the present invention.
Figure 6:
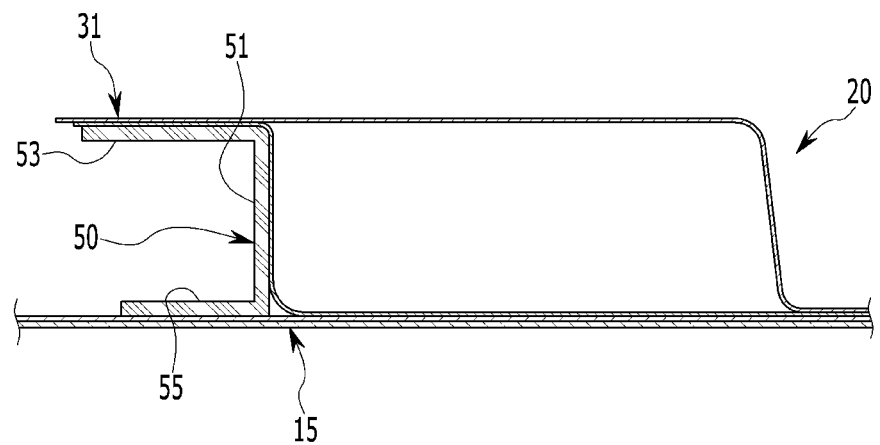

FIG. 5 and FIG. 6 are views showing a joint member portion applied to a side body structure for a vehicle according to an embodiment of the present invention.

Referring to FIG. 5 and FIG. 6 along with FIG. 1 to FIG. 3, the joint member 50 according to an embodiment of the present invention includes a joint bonding surface 51, a first joint flange 53, a second joint flange 55, and a third joint flange 57.

The joint bonding surface 51 is coupled to the pillar reinforcing surface 25 of the center pillar 20. The first joint flange 53 extends from one side edge of the joint bonding surface 51 in the vehicle body back and forth direction. The first joint flange 53 is coupled to the outer flange part 31 of the center pillar 20.

The second joint flange 55 extends from the other side edge of the joint bonding surface 51 in the vehicle body back and forth direction. The second joint flange 55 is coupled to the sill flange 15 of the side sill 10.

Figure 7:
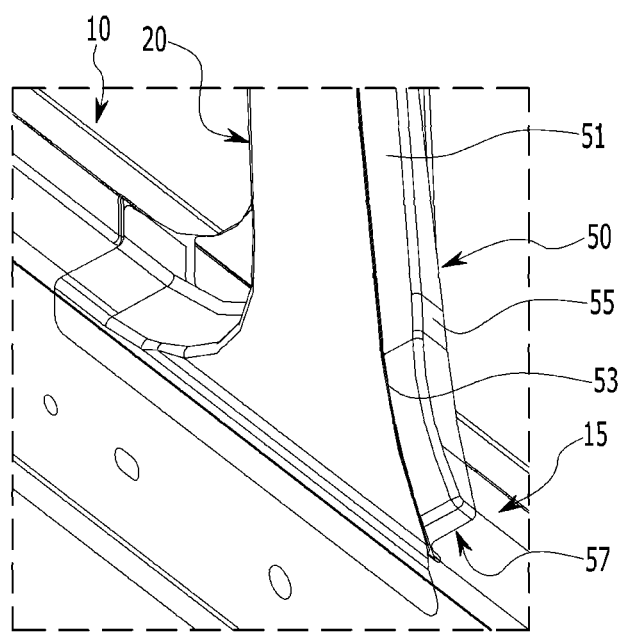
FIG. 7 is a perspective view showing a coupling structure of a joint member and a side sill applied to a side body structure for a vehicle according to an embodiment of the present invention.

Also, the third joint flange 57, as shown in FIG. 7, extends in the vehicle body back and forth direction along the lower part of the joint bonding surface 51 and is connected to the lower part of the first joint flange 53 and the lower part of the second joint flange 55. The third joint flange 57 is coupled to the upper surface of the side sill 10.

Figure 8:
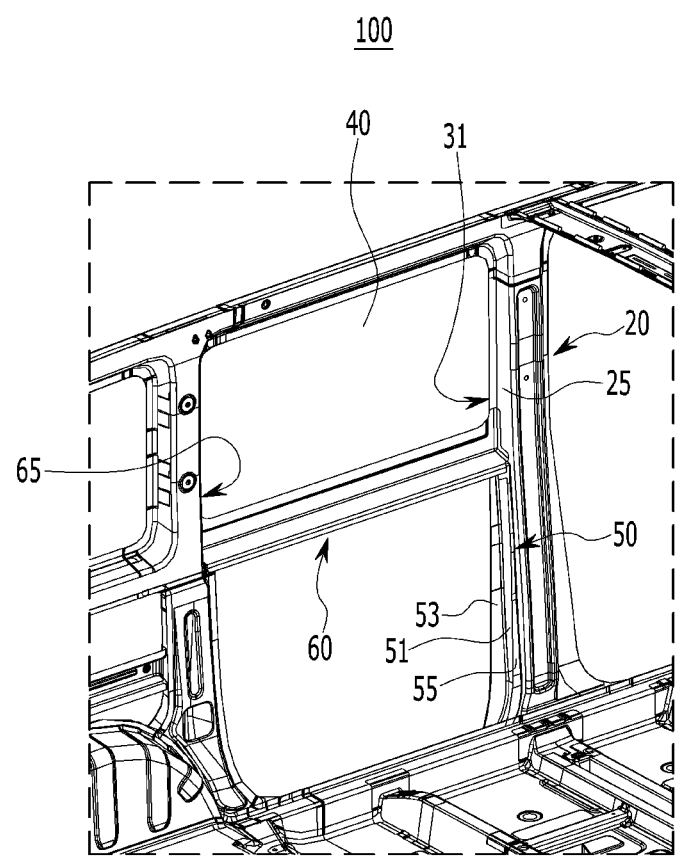
FIG. 8 to FIG. 10 are perspective views showing a coupling structure of a glass supporting member applied to a side body structure for a vehicle according to an embodiment of the present invention.

FIG. 8 to FIG. 1 are perspective views showing a coupling structure of a glass supporting member applied to a side body structure for a vehicle according to an embodiment of the present invention.

Figure 9A:
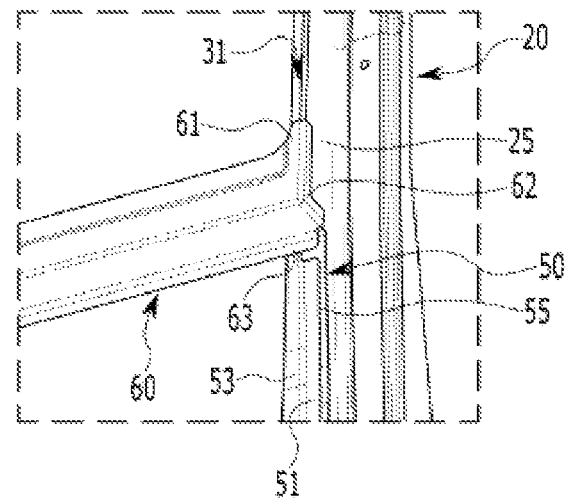
Figure 9B:
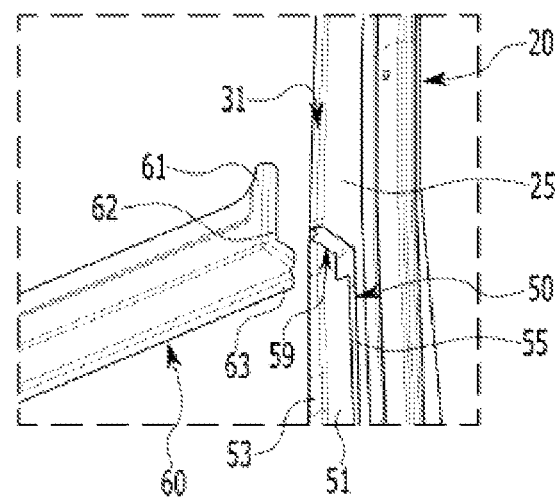
Figure 10:
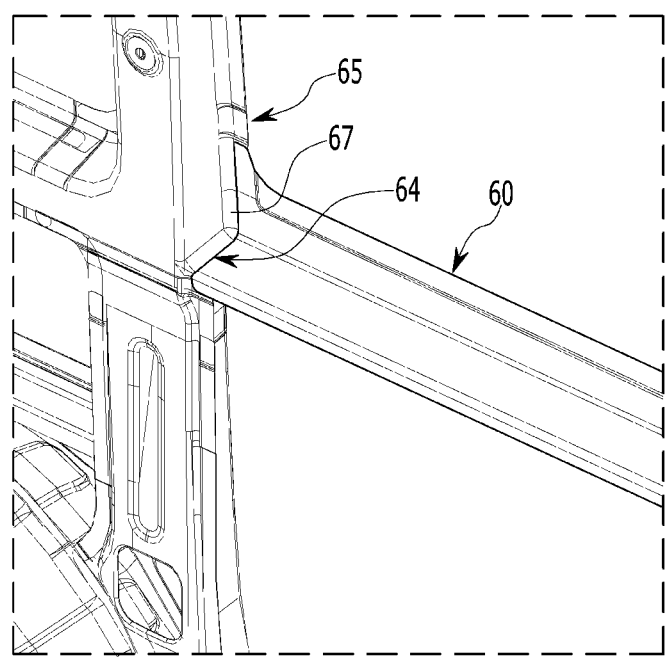

Referring to FIG. 8 to FIG. 10, the side body structure for the vehicle 100 according to an embodiment of the present invention further includes a glass supporting member 60.

In an embodiment of the present invention, the glass supporting member 60 is adapted to support the lower part of the glass 40 fixed to the outer flange part 31 of the center pillar 20.

The glass supporting member 60 is coupled to the pillar reinforcing surface 25 of the center pillar 20, the outer flange part 31, and the upper part of the joint member 50. Also, the glass supporting member 60 is coupled to the rear pillar 65 along the vehicle body back and forth direction.

The glass supporting member 60, in one example, may be provided with an "L" cross-sectional shape. The glass supporting member 60 includes a first bonding flange 61, a second bonding flange 62, and a third bonding flange 63 integrally formed at one end.

The first bonding flange 61 is coupled to the outer flange part 31 of the center pillar 20. The second bonding flange 62 is coupled to the pillar reinforcing surface 25 of the center pillar 20. Then, the third bonding flange 63 is coupled with the upper part of the joint member 50.

The glass supporting member 60 includes a fourth bonding flange 64 integrally formed at the other side end. The fourth bonding flange 64 may be coupled to the pillar flange 67 formed on the rear pillar 65 with the inner surface and the outer surface along the vehicle width direction and the upper surface along the vertical direction.

Here, the joint member 50 further includes a fourth joint flange 59 (referring to FIG. 5) adapted to bond one side end of the glass supporting member 60. The fourth joint flange 59 extends from the upper part of the joint bonding surface 51 along the vehicle body back and forth direction and is coupled to the upper part of the first joint flange 53 and the upper part of the second joint flange 55. The fourth joint flange 59 is coupled to the lower surface of the second bonding flange 62 side of the glass supporting member 60.

Figure 11:
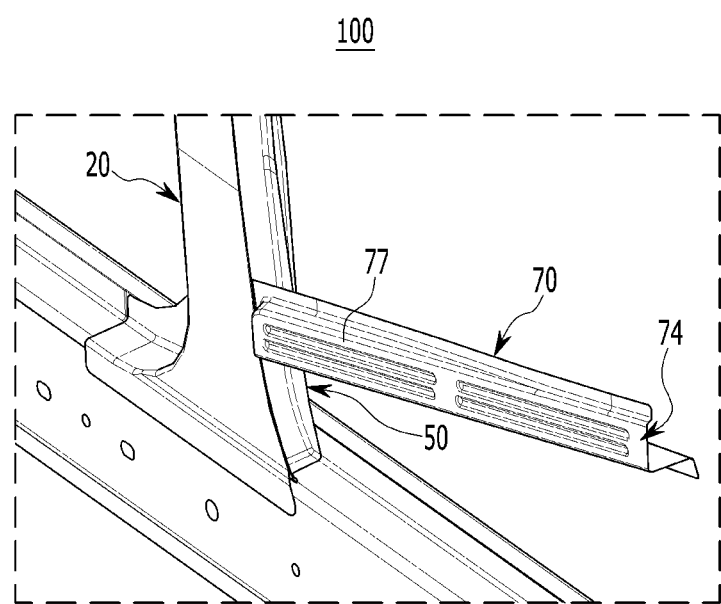
FIG. 11 to FIG. 13B are perspective views showing a coupling structure of an impact member and an extension member applied to a side body structure for a vehicle according to an embodiment of the present invention.
Figure 12A:
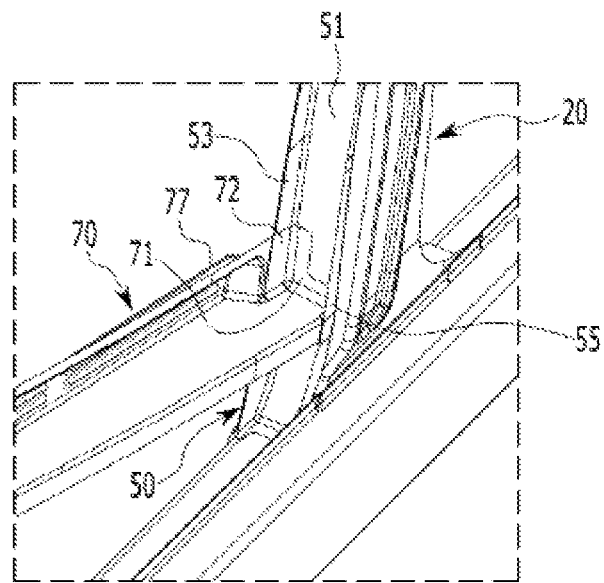
Figure 12B:
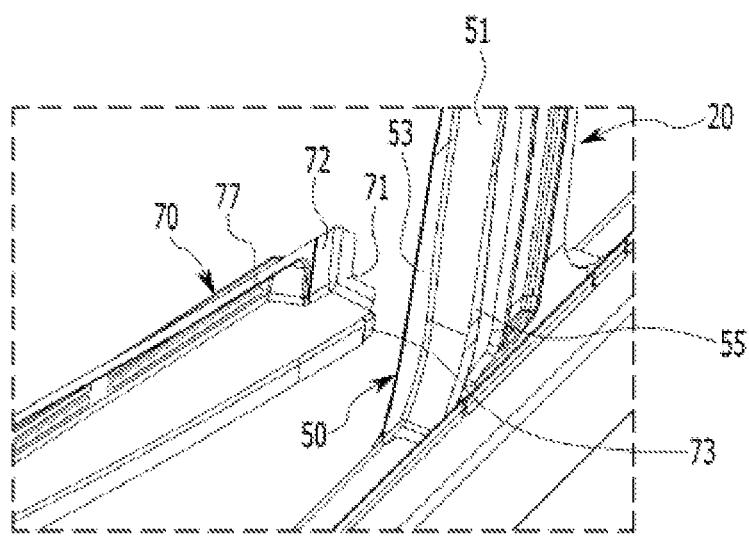
Figure 13A:
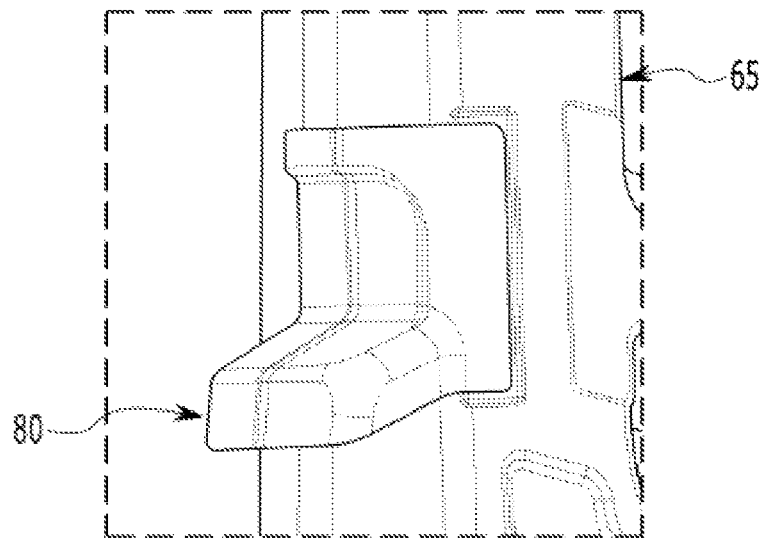
Figure 13B:
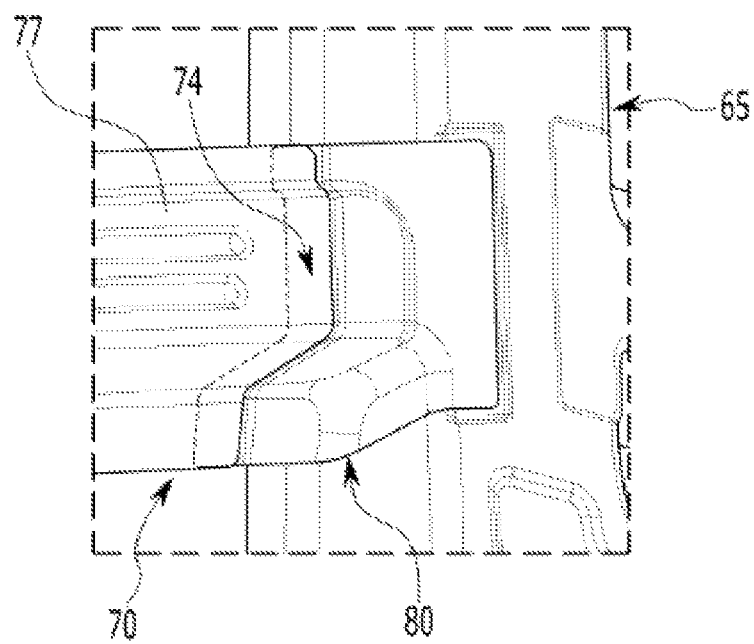
Figure 14:
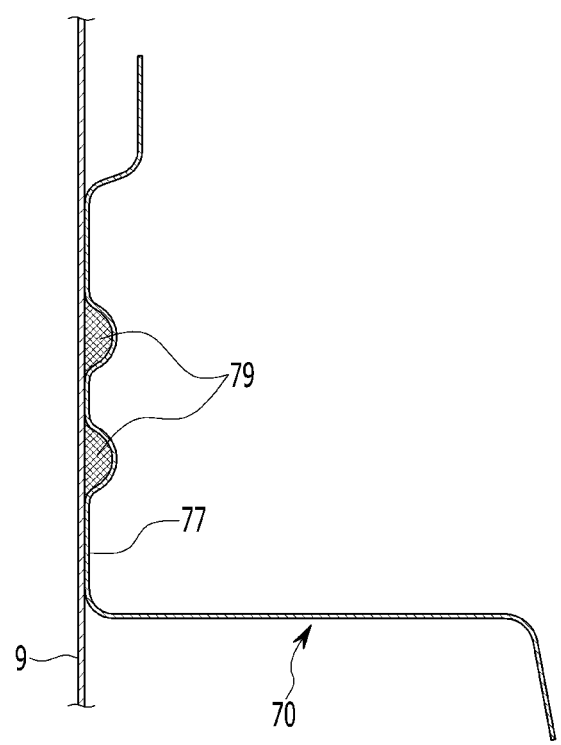
FIG. 14 is a cross-sectional view of a coupling structure of an impact member applied to a side body structure for a vehicle according to an embodiment of the present invention.

FIG. 11 to FIG. 13 are perspective views showing a coupling structure of an impact member and an extension member applied to a side body structure for a vehicle according to an embodiment of the present invention, and FIG. 14 is a cross-sectional view of a coupling structure of an impact member applied to a side body structure for a vehicle according to an embodiment of the present invention.

Referring to FIG. 11 to FIG. 14, the side body structure for the vehicle 100 according to an embodiment of the present invention further includes an impact member 70 and an extension member 80.

In an embodiment of the present invention, the impact member 70 is adapted to reinforce the strength of the outer side panel 9 assembled to the side body structure for the vehicle 100 and to increase the structural strength of the side body structure for the vehicle 100 against side collision.

The impact member 70 is coupled to the joint member 50 and coupled to the rear pillar 65 along the vehicle body back and forth direction. The impact member 70, in one example, may have an "L" cross-sectional shape.

The impact member 70 includes a fifth bonding flange 71, a sixth bonding flange 72, and a seventh bonding flange 73, which are integrally formed at one side end.

The fifth bonding flange 71 is coupled to the joint bonding surface 51 of the joint member 50. The sixth bonding flange 72 is coupled to the first joint flange 53 of the joint member 50. Also, the seventh bonding flange 73 is coupled to the second joint flange 55 of the joint member 50.

The impact member 70 includes an eighth bonding flange 74 formed on the other side end. The eighth bonding flange 74 is adapted to connect the impact member 70 to the rear pillar 65 through the extension member 80.

Further, the impact member 70 includes a forming part 77 protruded outward along the vehicle width direction. The forming part 77 is adapted to improve the strength of the outer side panel 9. The forming part 77 may be coupled to the outer side panel 9 by a bonding sealer 79.

In an embodiment of the present invention, the extension member 80 connects the other side end of the impact member 70 to the rear pillar 65 and is configured to form a rod path along the front and rear direction in the center pillar 20 and the rear pillar 65.

The extension member 80 may be first coupled to the rear pillar 65 formed of a closed cross-section and may be coupled to the eighth bonding flange 74 of the impact member 70.

According to the side body structure for the vehicle 100 according to an embodiment of the present invention configured as described above, since the glass 40 is fixed to the outer flange part 31 of the center pillar 20, the mounting ability of the glass 40 may be improved.

Furthermore, in the side body structure for the vehicle 100 according to an embodiment of the present invention, the outer flange part 31 is provided on the outermost side along the vehicle width direction of the center pillar 20 without the step difference with the outer pillar member 21.

Therefore, in the side body structure for the vehicle 100 according to an embodiment of the present invention, the skin of the glass 40, the skin of the center pillar 20, the skin of the door (not shown) mounted on the door mounting part 8, and the skin of the side sill 10 may be connected without a step.

In addition, the side body structure for the vehicle 100 according to an embodiment of the present invention includes the joint member 50 coupled to the outer flange part 31 of the center pillar 20 and the sill flange 15 of the side sill 10, which are spaced apart from each other.

Accordingly, the side body structure for the vehicle 100 according to an embodiment of the present invention may secure the structural strength of the center pillar 20 and secure the connection robustness of the center pillar 20 and the side sill 10.

Specifically, in the side body structure for the vehicle 100 according to an embodiment of the present invention, when the glass 40 is mounted on the outer flange part 31 provided on the outermost side along the vehicle width direction of the center pillar 20, the sill flange 15 of the side sill 10 has to be configured on the inside for the connection (e.g., a sealing characteristic) with the door.

In this case, since the outer flange part 31 and the sill flange 15 are inevitably spaced apart from each other, the side body structure for the vehicle 100 according to an embodiment of the present invention may connect (e.g., couple) the outer flange part 31 and the sill flange 15 through the joint member 50 and obtain the coupling strength of the center pillar 20 and the side sill 10.

Further, as the side body structure for the vehicle 100 according to an embodiment of the present invention connects the center pillar 20, the joint member 50, and the rear pillar 65, and includes the glass supporting member 60 supporting the glass 40, the support strength of the glass 40 may be further increased.

Further, the side body structure for the vehicle 100 according to an embodiment of the present invention includes the impact member 70 and the extension member 80 connecting the center pillar 20, the joint member 50, and the rear pillar 65.

Therefore, the side body structure for the vehicle 100 according to an embodiment of the present invention may secure the strength of the outer side panel 9 and further increase the structural strength against the side collision.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A side body structure for a vehicle, the side body structure comprising:
   a center pillar comprising an outer flange part extending from an outer surface of the center pillar in a vehicle body length direction;
   a side sill, wherein the outer flange part is coupled to the side sill;
   a glass coupled to the outer flange part; and
   a joint member coupled to the outer flange part and the side sill in a vertical direction, wherein the joint member comprises:
      a joint bonding surface coupled to a pillar reinforcing surface of the center pillar along the vehicle body length direction;
      a first joint flange extending from a first side edge of the joint bonding surface in the vehicle body length direction and coupled to the outer flange part;
      a second joint flange extending from a second side edge of the joint bonding surface in the vehicle body length direction and coupled to a sill flange disposed on the side sill; and
      a third joint flange coupled to a lower part of the first joint flange and a lower part of the second joint flange and coupled to an upper surface of the side sill.

2. The side body structure of claim 1, wherein the outer flange part is connected in the same plane as the outer surface of the center pillar and is provided at an outermost side of the center pillar in a vehicle width direction.

3. The side body structure of claim 1, wherein the sill flange is spaced apart from the outer flange part.

4. The side body structure of claim 1, further comprising a glass supporting member coupled to the pillar reinforcing surface of the center pillar along the vehicle body length direction, the outer flange part, and an upper part of the joint member and coupled to a rear pillar along the vehicle body length direction.

5. The side body structure of claim 4, wherein the joint member further comprises a fourth joint flange coupled to an upper part of the first joint flange and an upper part of the second joint flange and coupled to the glass supporting member.

6. The side body structure of claim 1, further comprising an impact member coupled to the joint member and coupled to a rear pillar along the vehicle body length direction, wherein the impact member comprises a forming part protruded outward along a vehicle width direction and coupled to an outer side panel.

7. The side body structure of claim 6, wherein:
   the joint bonding surface is coupled to the impact member;
   the first joint flange is coupled to the impact member; and
   the second joint flange is coupled to the impact member.

8. The side body structure of claim 7, further comprising an extension member coupled to the rear pillar and the impact member.

9. A side body structure for a vehicle, the side body structure comprising:
   a center pillar comprising an outer flange part extending along a vehicle body length direction and coupled to a side sill;
   a joint member coupled to the outer flange part and the side sill in a vertical direction; and
   a glass supporting member coupled to a pillar reinforcing surface of the center pillar along the vehicle body length direction, the outer flange part, and an upper part of the joint member and coupled to a rear pillar along the vehicle body length direction.

10. The side body structure of claim 9, wherein:
    the side sill comprises a sill flange spaced apart from the outer flange part; and
    the joint member is coupled to the outer flange part and the sill flange.

11. The side body structure of claim 9, wherein the joint member comprises:
    a joint bonding surface bonded to the pillar reinforcing surface of the center pillar along the vehicle body length direction;
    a first joint flange extending from a first side edge of the joint bonding surface in the vehicle body length direction and coupled to the outer flange part; and
    a second joint flange extending from a second side edge of the joint bonding surface in the vehicle body length direction and coupled to a sill flange disposed on the side sill.

12. The side body structure of claim 11, wherein the joint member further comprises a third joint flange coupled to a lower part of the first joint flange and a lower part of the second joint flange and coupled to an upper surface of the side sill.

13. The side body structure of claim 9, wherein the joint member comprises:

a joint bonding surface coupled to the pillar reinforcing surface;

a first joint flange extending from a first side edge of the joint bonding surface in the vehicle body length direction and coupled to the outer flange part;

a second joint flange extending from a second side edge of the joint bonding surface in the vehicle body length direction and coupled to a sill flange disposed on the side sill;

a third joint flange coupled to a lower part of the first joint flange and a lower part of the second joint flange and coupled to an upper surface of the side sill; and a fourth joint flange coupled to an upper part of the first joint flange and an upper part of the second joint flange and coupled to the glass supporting member.

14. The side body structure of claim 9, further comprising an impact member coupled to the joint member and coupled to the rear pillar along the vehicle body length direction.

15. The side body structure of claim 14, wherein the joint member comprises:

a joint bonding surface coupled to the pillar reinforcing surface of the center pillar along the vehicle body length direction and coupled to the impact member;

a first joint flange extending from a first side edge of the joint bonding surface in the vehicle body length direction and coupled to the outer flange part and the impact member; and a second joint flange extending from a second side edge of the joint bonding surface in the vehicle body length direction and coupled to the impact member and a sill flange disposed on the side sill.

16. The side body structure of claim 14, wherein the impact member comprises a forming part protruded outward along a vehicle width direction and coupled to an outer side panel.

17. The side body structure of claim 14, further comprising an extension member coupled to the rear pillar and the impact member.

18. A side body structure for a vehicle, the side body structure comprising:

a center pillar comprising an outer flange part extending from an outer surface of the center pillar in a vehicle body length direction;

a glass coupled to the outer flange part;

a side sill, wherein the outer flange part is coupled to the side sill;

a joint member coupled to the outer flange part and the side sill in a vertical direction; and an impact member coupled to the joint member and coupled to a rear pillar along the vehicle body length direction, wherein the impact member comprises a forming part protruded outward along a vehicle width direction and coupled to an outer side panel.

19. The side body structure of claim 18, wherein the joint member comprises:

a joint bonding surface coupled to a pillar reinforcing surface of the center pillar along the vehicle body length direction and coupled to the impact member;

a first joint flange extending from a first side edge of the joint bonding surface in the vehicle body length direction and coupled to the outer flange part and the impact member; and a second joint flange extending from a second side edge of the joint bonding surface in the vehicle body length direction and coupled to the impact member and a sill flange disposed on the side sill.

20. The side body structure of claim 19, further comprising an extension member coupled to the rear pillar and the impact member.

* * * * *